(No Model.)

D. E. ASHER.
HARROW.

No. 257,998. Patented May 16, 1882.

Witnesses:
H. A. Daniels.
R. T. Campbell.

Inventor:
Daniel E. Asher
By G. B. Towles.
Attorney.

UNITED STATES PATENT OFFICE.

DANIEL E. ASHER, OF GOSPORT, INDIANA.

HARROW.

SPECIFICATION forming part of Letters Patent No. 257,998, dated May 16, 1882.

Application filed July 25, 1881. (No model.)

*To all whom it may concern:*

Be it known that I, DANIEL E. ASHER, a citizen of the United States, residing at Gosport, in the county of Owen and State of Indiana, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of harrows having an outer and an inner frame, the former being provided with knives for cutting the sod, and the latter being provided with pulverizing-teeth. The diagonal side beams of the outer frame are provided with recesses on their outer and inner sides to receive the upright arms or shanks of the knives, which are made with inclined or drawing edges, as heretofore, the said upright shanks being attached in the said recesses in such a manner that the knives are held in lines parallel with the line of draft. Further, the said knives are simple and durable, both in construction and attachment to the harrow-frame.

Figure 1:
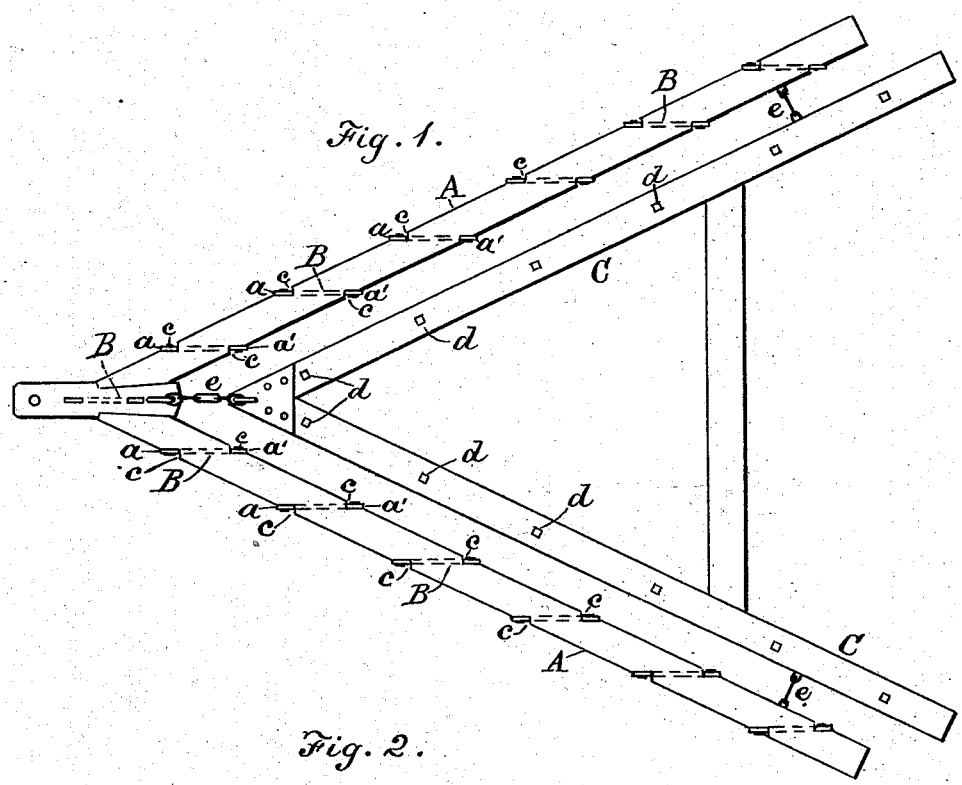
Figure 2:
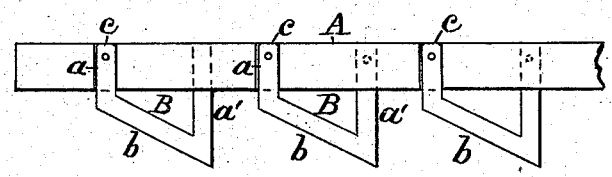
Figure 3:
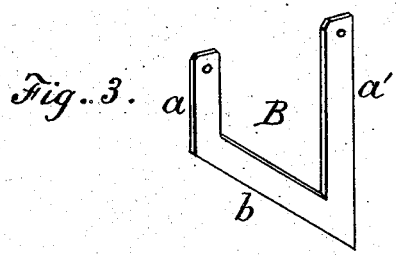

In the accompanying drawings, Figure 1 is a plan of a triangular land-harrow having my improvement. Fig. 2 illustrates in side view the sod-cutting knives and manner of attaching them. Fig. 3 represents one of the knives detached.

A designates the outer frame of the harrow, provided with the teeth or knives B for cutting the sods and clods. Each of the said knives is formed, as shown in Fig. 3, with the forward upright shank, $a$, and the rear upright shank, $a'$, the two being connected by the blade $b$, which is inclined downward from front to rear, so that as the harrow moves forward a draw cut through the sods is effected. Each side beam of the frame A has recesses $c$ on its outer and inner sides, in which the upright arms or shanks $a$ and $a'$ are bolted to the beam, so that each knife is fastened at two points. The said recesses are cut far enough into the sides of the beam, the latter being in a diagonal position, as shown, so that when the shank $a$ rests in a recess on the outer side (see Fig. 1) and the shank $a'$ rests in a recess on the inner side the blade of the knife is on a line parallel with the line of draft.

C indicates an inner harrow-frame provided with ordinary harrow-teeth, $d$, for pulverizing the lumps as the said frame follows the forward frame, A, to which it is attached by means of hooks and links $e$. The teeth $d$ are usually arranged in the frame C, so that as the harrow moves forward the tracks of said teeth come between the tracks of the knives B. The loose connection of the two frames allows a somewhat independent motion of each frame when the harrow passes over uneven surfaces, and the frames are readily unhooked for separate use, as desired.

I am aware of United States Patents No. 34,974, dated April 15, 1862, No. 140,198, dated June 24, 1873, and No. 219,229, dated September 2, 1879, showing certain constructions of knives and modes of attachment to harrow-frames, and I do not claim any of them; but none of the said devices fulfill the purpose and object of my invention, as herein described.

I claim—

In a triangular harrow, the outer side beams, having their outer and inner sides formed with recesses $c$, in combination with the knives, constructed as shown, with the inclined cutting-blade $b$ and the vertical shanks $a$ and $a'$, said shanks being bolted in said recesses to bring the blades of the knives on lines parallel with the line of draft, as herein set forth and described.

In testimony whereof I affix my signature in presence of two witnesses.

DANIEL E. ASHER.

Witnesses:
 J. W. SMITH,
 W. A. LAUGHLIN.